No. 825,608. PATENTED JULY 10, 1906.
T. R. McKNIGHT.
CONVEYER FOR ROCK CRUSHERS.
APPLICATION FILED NOV. 6, 1905.
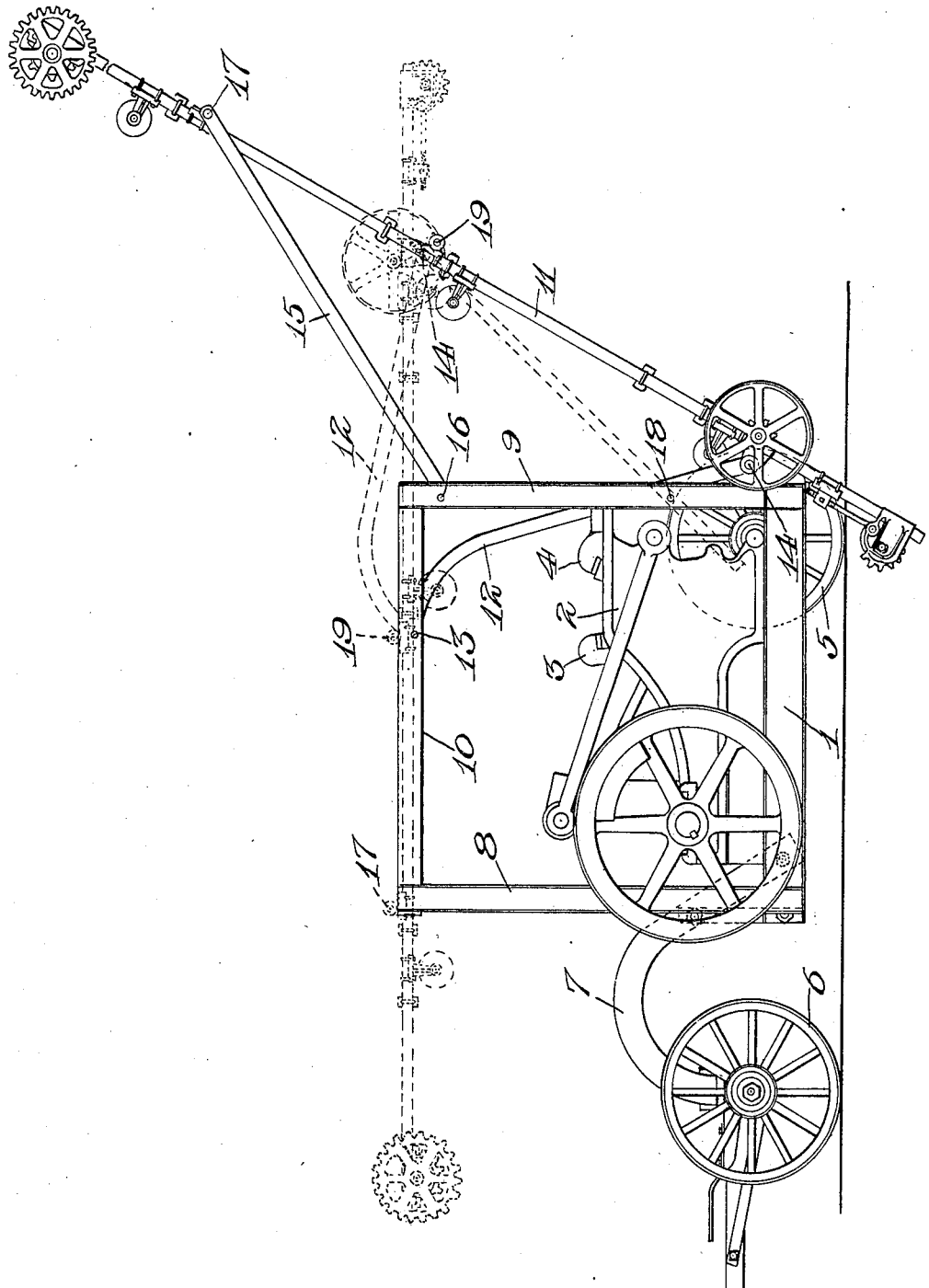
Witnesses:
Inventor:

UNITED STATES PATENT OFFICE.

THOMAS R. McKNIGHT, OF AURORA, ILLINOIS, ASSIGNOR TO WESTERN WHEELED SCRAPER COMPANY, OF AURORA, ILLINOIS, A CORPORATION OF ILLINOIS.

CONVEYER FOR ROCK-CRUSHERS.

No. 825,608.     Specification of Letters Patent.     Patented July 10, 1906.

Application filed November 6, 1905. Serial No. 286,069.

*To all whom it may concern:*

Be it known that I, THOMAS R. MCKNIGHT, a citizen of the United States, residing at Aurora, in the county of Kane, State of Illinois, have invented certain new and useful Improvements in a Combined Rock Crusher and Conveyer, of which the following is a true and complete specification, reference being had to the accompanying drawing.

This invention relates to rock-crushers of that class that have combined therewith a conveyer for the purpose of carrying away from the crusher the rock broken up by such crusher. In machines of this class it is necessary to frequently move them along roadways from place to place, and to that end such machines are mounted on a wheeled frame. Heretofore it has been deemed necessary to make the conveyer-frame in sections and to disconnect such sections when the machine as a whole was to be moved from place to place. Such disconnecting of the sections of the conveyer-frame also necessitated, of course, the entire removal of the conveyer-belt, and the work of so dismantling the conveyer in order that the machine might be moved and again assembling the parts at the place where the machine was to be again operated necessarily consumed a large amount of time in addition to taking considerable labor.

It is the object of my invention to so construct a conveyer-frame and connect it with the crusher as to render it unnecessary to take the conveyer-frame apart or to remove the conveyer-belt therefrom when it is desired to move the machine as a whole from place to place. I accomplish this object as illustrated in the drawing and as hereinafter specifically described.

That which I believe to be new will be pointed out in the claims.

In the drawing the figure shown is a side elevation of an ordinary form of rock-crusher, showing also my improved conveyer and means for connecting the same with the crusher, the dotted lines in said figure showing the position of the parts when the conveyer is in position above the crusher ready for transportation.

Referring to the drawing, 1 indicates one of a pair of side bars of the base-frame, these side bars being connected together by a hopper 2, bolted to said side bars, said hopper receiving the rock to be crushed between the opposing jaws 3 4, such jaws being operated as usual.

5 indicates one of a pair of rear traction-wheels, and 6 one of the front pair of traction-wheels. The wheels 5 are suitably journaled in brackets affixed to the side bars 1, and the front wheels are journaled at the forward end of a gooseneck, as usual.

8 indicates one of a pair of standards rising from the front ends of the side bars 1, and 9 indicates one of a pair of similar standards rising from the rear ends of said side bars. The upper ends of these uprights 8 9 are connected by bars, one of which is shown at 10.

11 indicates a conveyer-frame formed of two parallel side bars, one of such being shown in the drawing and spaced a suitable distance apart to adapt them to receive and properly support an endless conveyer-belt. The said conveyer-frame is to be provided at its opposite ends, as shown, with suitable sprocket-wheels to receive the links of an endless chain which carries the conveyer-belt, and such movable conveyer will be driven by means of a power-pulley in the usual manner. The conveyer-frame will also be provided, as usual, with idlers at suitable intervals to afford support to the conveyer-belt. I have not shown a movable conveyer attached to the conveyer-frame, as there is nothing novel in that so far as relates to my invention, nor do I deem it necessary to specifically describe the means for driving the conveyer, supporting the same, &c., as all that is well known.

My conveyer-frame is a rigid one, and by that expression I mean that it is held extended in a straight line at all times, even when turned into position over the rock-crusher for the purpose of being moved with such rock-crusher from place to place. The frame may be jointed in one or more places, if deemed advisable, in order to facilitate shipping by rail; but whether so made or whether the side bars are continuous in one piece from end to end, the said frame when it is turned into position over the rock-crusher for the purpose of being transported from place to place with such crusher will be held extended rigidly to the same extent that it must be when supported in operative position. The frame 11, with the conveyer-belt applied thereto, is supported in operative position, as shown in full lines in the drawing, by a pair of arms 12, each pivotally secured at its upper end to one of the upper cross-bars 10, the point of attachment of the arm shown being indicated by 13, and at its lower end pivotally attached at 14 to the bracket on one of the side bars of the frame 11. These arms 12 in the form of construction shown are curved somewhat in their upper portions in order that they may properly pass the hopper 2.

15 indicates one of a pair of braces, each extending from one of the uprights 9 upward to a point near the upper end of the conveyer-frame 11, to which frame it is suitably attached, the point of the attachment of the brace 15 to the upright 9 being indicated by 16 and being attached to the frame 11 by being connected to the projecting end of a cross-bar 17, extending across and secured to the side bars of the said conveyer-frame.

When the conveyer-frame is in the position shown in the full lines, it is in approximately the correct position for conveying crushed rock upward to the point of discharge, such crushed rock falling upon the conveyer-belt or into the buckets carried thereby from the lower end of the hopper 2. In this position the frame 11 will rest against the lower edge of the rock-crusher-supporting frame or against bearing-blocks affixed thereto. When the parts are in the position shown in the full lines in the drawing, it will be seen that the conveyer-frame is rigidly held in the required position by the arms 12 and braces 15. Now when it is desired to move the device as a whole to another place a rope or cable is to be attached to the frame 11 near its upper end and such rope carried forward and secured in front of the crusher. When thus held, the braces are to be disconnected from the uprights 9 and from the conveyer-frame and the conveyer-frame pulled forward by means of the rope or cable referred to, preferably by means of tackle-blocks, and such pulling on the rope or cable will cause the conveyer-frame to turn on its pivots 14 and the arms 12 to turn on their pivots 13 until the conveyer-frame lies substantially horizontally over the rock-crusher with its ends projected beyond the uprights 8 9, as indicated in dotted lines. The arms 12 being connected at all times with the conveyer-frame will of course move with such frame, and when the frame is in its substantially horizontal position, as indicated, will assume substantially the position shown by dotted lines in the drawing. When the conveyer-frame has been swung into the position just described, the braces 15 are to be again attached to it and to the uprights 9, the position that they will then be in being indicated by dotted lines and the point of attachment to the uprights 9 being indicated by 18. In this latter position they will, as will be evident, afford a very strong support and prevent displacement of the frame 11 from its position over the crusher. When the conveyer-frame is in its substantially horizontal position, it will lie between the pair of bars 10 and will be supported thereon by the projecting ends of the cross-bars 17, which rest on the upper edges of such bars 10. Other cross-bars on the conveyer-frame similar to the cross-bar 17 may be provided for furnishing additional support to the conveyer, one such additional cross-bar being shown and indicated by 19.

By my invention much time and hard manual labor are saved whenever it is necessary to move the device as a whole, and whenever it is required to place the parts in operative position after the machine has been moved to the desired location, for by my improvements the entire conveyer (and I include by this term the frame, the belt, the buckets, the chains, &c.) is moved bodily over the crushing-machine, and this without removing or disconnecting any parts except the two braces 15, and when so turned into riding position the conveyer is rigidly held by the same braces, which braces can of course be very readily attached and detached.

What I claim as new, and desire to secure by Letters Patent, is—

1. The combination with a frame and an arm pivoted thereto, of a conveyer-frame pivotally attached to said arm and adapted to be turned with said arm into a substantially horizontal position, substantially as specified.

2. The combination with a frame and an arm pivoted thereto, of a conveyer-frame pivotally attached to said arm and adapted to be swung with said arm into a substantially horizontal position, and a brace for connecting said frame and conveyer-frame together, substantially as specified.

3. The combination with a frame and an arm pivoted thereto, of a conveyer-frame pivotally attached to said arm and adapted to be swung with said arm into a substantially horizontal position, and a movable brace adapted to be secured to said frame and conveyer-frame to hold the latter in either its operative or inoperative position, substantially as specified.

4. The combination with a support, as a rock-crusher, of a conveyer-frame having its lower end adapted to project below said support, a frame carried by said support, an arm pivoted at its upper end to said frame and at its lower end to said conveyer-frame, said conveyer-frame and arm being adapted to be turned to lie in a substantially horizontal position over said support, and means for holding said conveyer-frame in operative position, substantially as specified.

5. The combination with a support, as a rock-crusher, of a conveyer-frame having its lower end adapted to project below said support, a frame carried by said support, an arm pivoted at its upper end to said frame and its lower end to said conveyer-frame, said conveyer-frame and arm being adapted to be turned to lie in a substantially horizontal position over said support, and removable means adapted when in one position to hold said conveyer-frame in operative position and when in another position to hold it in its position over said support, substantially as specified.

THOMAS R. McKNIGHT.

Witnesses:
M. EAGELSTON,
CHAS. OHL.